Aug. 4, 1970  A. GROSSMAN  3,522,684
WATER BARRIER COUPLING MEANS FOR VERTICAL MULLIONS
Original Filed Oct. 18, 1967  4 Sheets-Sheet 3
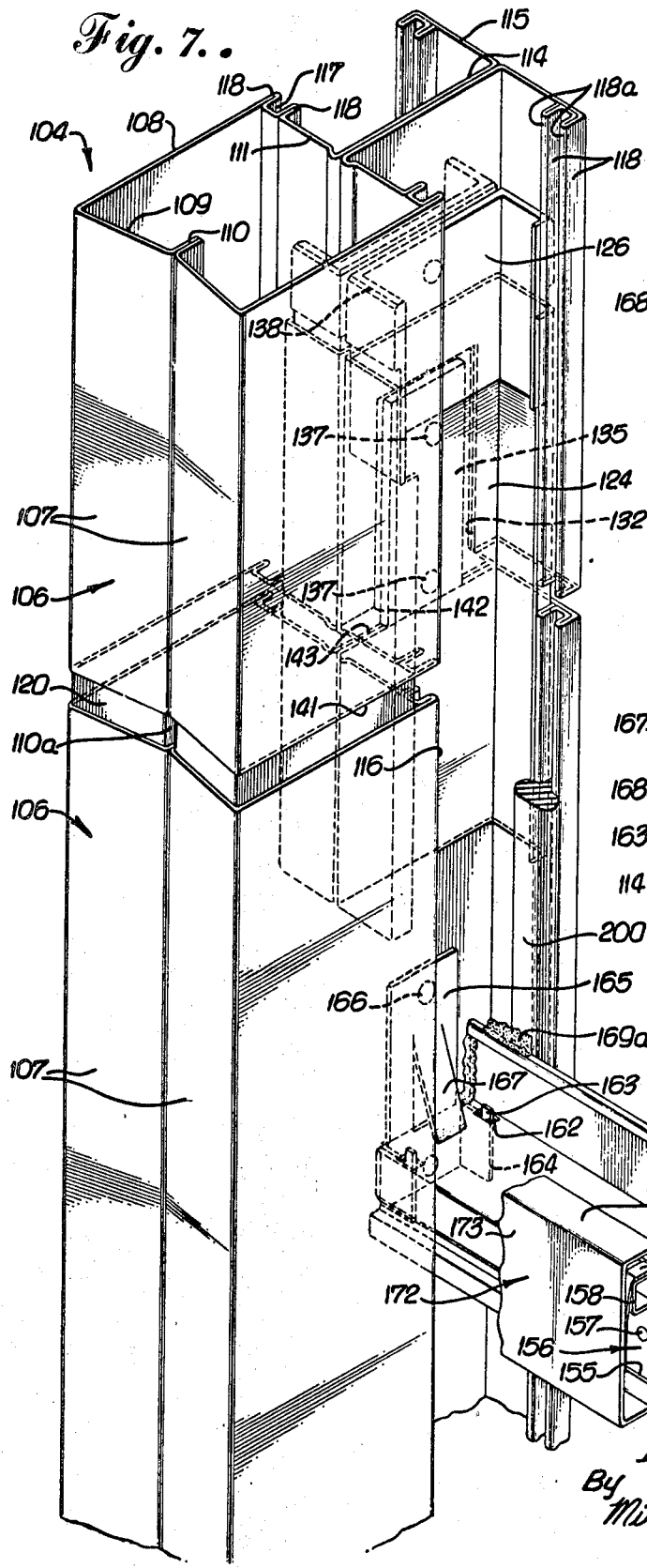
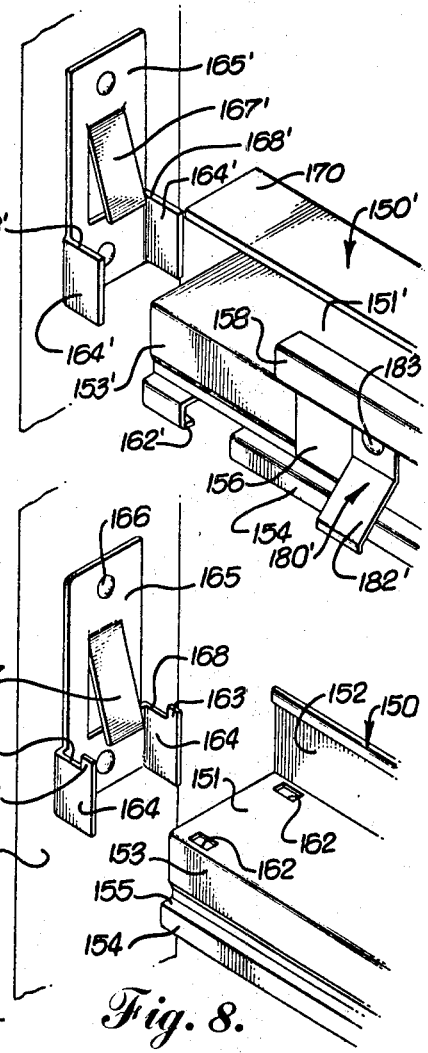
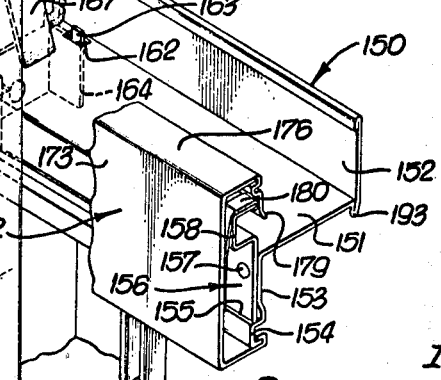
INVENTOR.
ABRAHAM GROSSMAN
By Miketta, Glenny, Poms & Smith
ATTORNEYS.

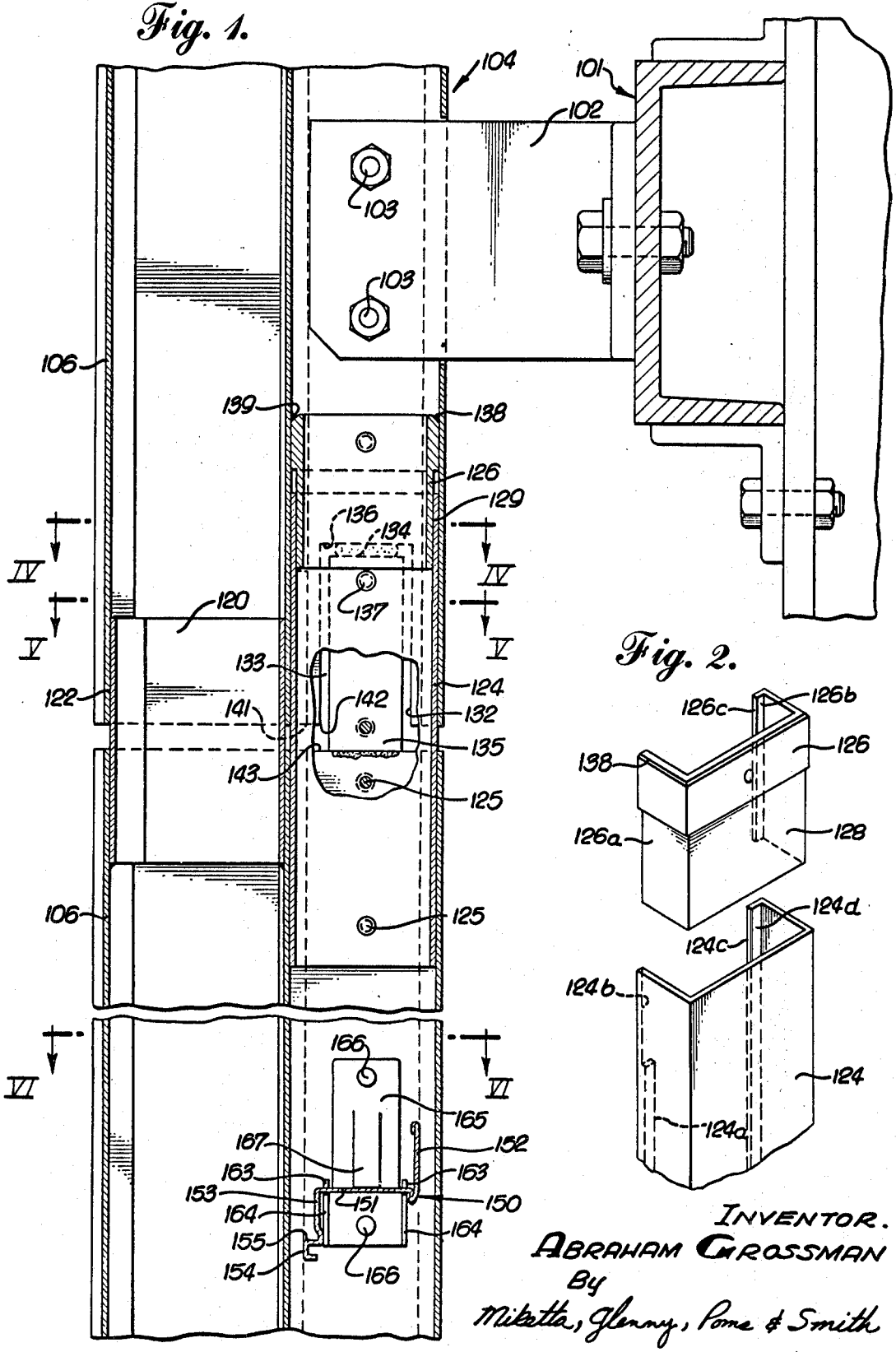

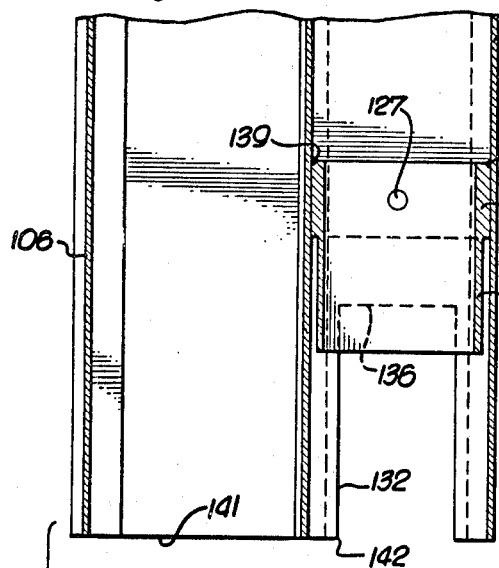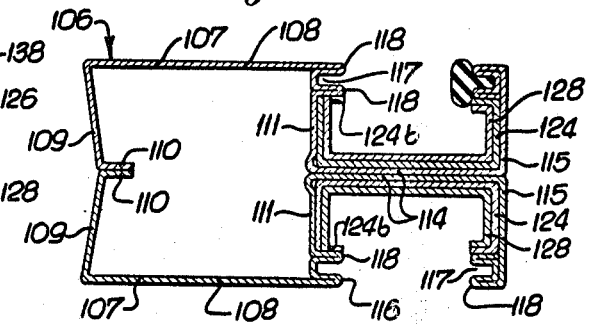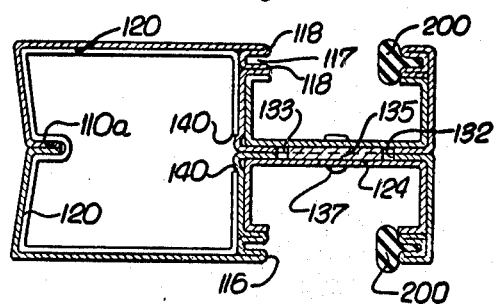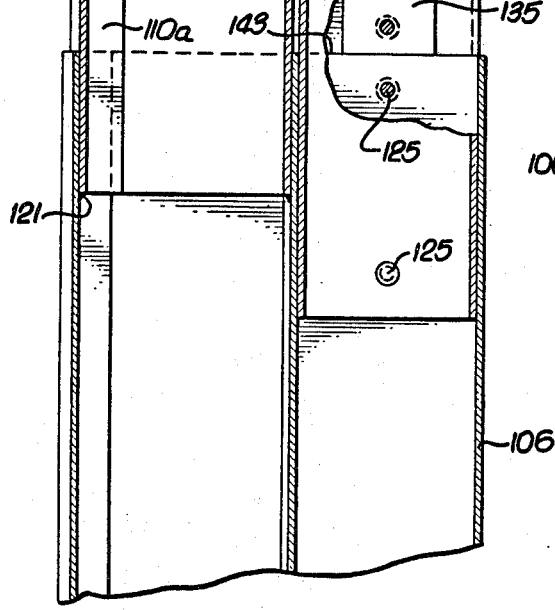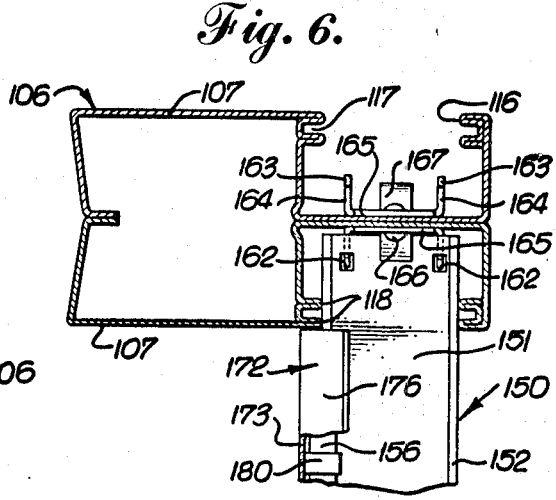

Aug. 4, 1970 A. GROSSMAN 3,522,684
WATER BARRIER COUPLING MEANS FOR VERTICAL MULLIONS
Original Filed Oct. 18, 1967 4 Sheets-Sheet 4
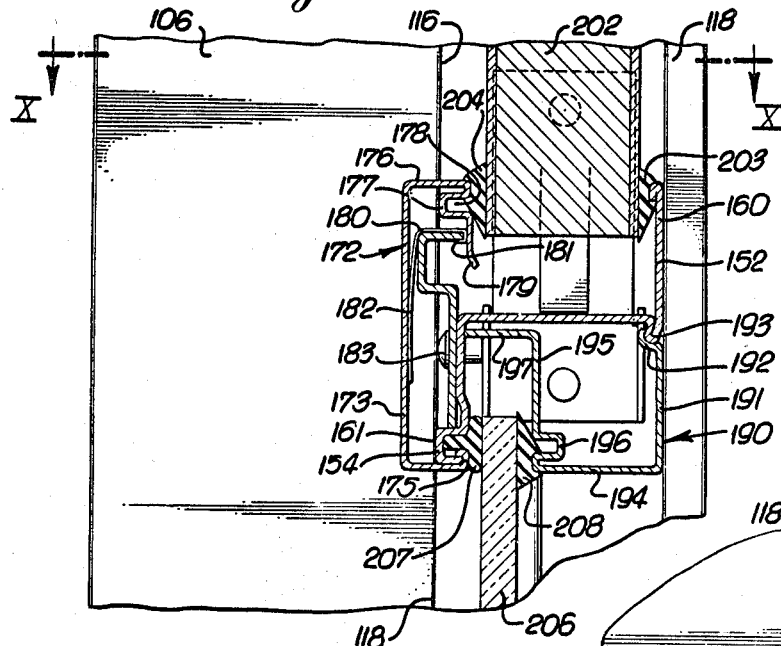
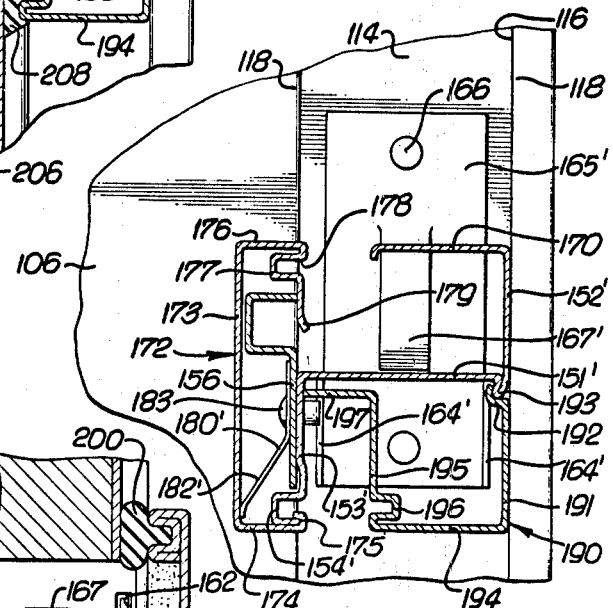
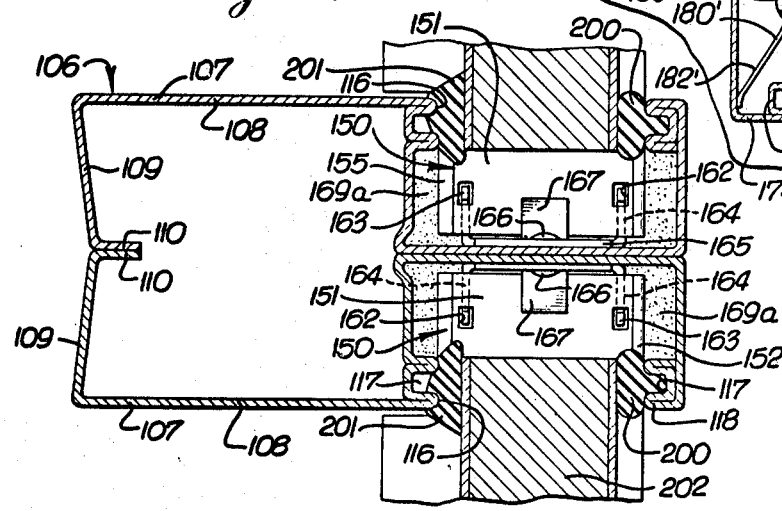
INVENTOR.
ABRAHAM GROSSMAN
By
Miketta, Glenny, Poms & Smith
ATTORNEYS.

United States Patent Office 3,522,684
Patented Aug. 4, 1970

3,522,684
WATER BARRIER COUPLING MEANS FOR VERTICAL MULLIONS
Abraham Grossman, 9339 Rhea, Northridge, Calif. 91325
Original application Oct. 18, 1967, Ser. No. 676,240. Divided and this application Jan. 3, 1969, Ser. No. 788,793
Int. Cl. E04b 2/88; E04c 3/32; E04h 1/04
U.S. Cl. 52—393    10 Claims

ABSTRACT OF THE DISCLOSURE

A curtain wall construction including vertical mullions anchored to a building structure and horizontal members supported from the mullions and readily assembled therewith in interlocking fashion and for permitting expansion and contraction of the horizontal members. Vertical mullions are coupled or spliced together by telescopic sleeve means to provide a weatherproof and water barrier construction. Curtain wall panels are held in assembly by separable molding clip means associated with the vertical mullions and horizontal members and by external retainer means carried by the horizontal members under resilient pressure.

The present application is a divisional application of application Ser. No. 676,240, filed Oct. 18, 1967, now Pat. No. 3,436,887 which application Ser. No. 676,240 was a continuation-in-part application of Ser. No. 336,824, filed Jan. 9, 1964, and now issued as United States Letters Patent No. 3,357,145 entitled Curtain Wall Construction Allowing Vertical and Horizontal Expansion.

BACKGROUND OF THE INVENTION

In the building industry today, the use of curtain wall construction for use in single as well as multi-story structures is desirable for economy, simplicity, appearance and ease of assembly. Curtain walls enable architects to utilize both fixed glass and/or operable sash on the exterior of the building at economical costs.

The frame members of curtain walls in use today are primarily made of aluminum. However, stainless steel is both desirable and in some respects will afford a better construction. It has been difficult, if not impossible, to use stainless steel in frames for curtain walls due to the difficutly of fabrication in the shop or assembly on the job. The present invention completely obviates this problem. Moreover, in prior proposed curtain wall constructions during assembly of the curtain wall on the structural steel framing, horizontal and vertical members of such curtain wall constructions required interconnecting such prior proposed horizontal and vertical members by bolting, riveting or other hardware attached to either or both of such members. Installation of such prior proposed curtain wall assemblies involved high labor costs. In such prior curtain wall constructions, mullion joints permitted leakage of water through the curtain wall by traveling of the water along the bottom ends of the mullions either by a driving wind or capillary action.

SUMMARY OF THE INVENTION

The present invention contemplates a curtain wall construction provided with features and advantages as described in original application Ser. No. 336,824, now U.S. Letters Patent No. 3,357,145, and embodied in modified constructions of the mullion and horizontal member interconnection, the water barrier mullion joint or coupling, and the construction of said mullions and horizontal members with respect to fenestration framing.

It is therefore, an object of the present invention to provide an improved curtain wall construction which can be easily and quickly assembled, structurally acceptable in the trade, and which will provide for expansion and contraction of the curtain wall frame without setting up undue stress in the members thereof while providing water-tight integrity.

A further object of the present invention is to provide an improved connection for joining horizontal members to a vertical mullion in a curtain wall construction in a quick and easy manner.

A still further object of the invention is to provide an improved novel means of coupling or splicing adjacent mullion ends within a curtain wall construction to prevent leakage of water from the exterior of the curtain wall toward and to the interior of the curtain wall.

A still further object of the invention is to provide an improved structural readily assembled mullion joint means.

Specific objects of the present invention are to disclose and provide a curtain wall construction in which the cross-sectional configuration of the vertical mullions and the horizontal members interconnected therewith cooperate in an improved manner so that assembly of the curtain construction is facilitated, expansion and contraction of horizontal members and vertical mullions is more readily permitted while maintaining water-tight integrity and proper support of curtain wall panels, the provision of a horizontal member including a retainer member adapted to be readily clipped into assembly with the horizontal member and maintained in non-rattling assembly therewith by resilient spring biased pressure, the provision of an internal panel retainer member readily engageable with a horizontal member and a panel whereby panels may be disassembled and asembled in the curtain wall construction from the interior of the building structure if desired, and the provision of an improved means for releasably interconnecting the horizontal member with the vertical mullion.

Other objects and advantages of the present invention will be readily apparent from the following description of the drawings in which exemplary embodiments of the invention are shown.

In the drawings:

FIG. 1 is fragmentary vertical sectional view of a mullion joint showing a different embodiment of the invention, the section being taken in a vertical plane passing through one of the mullion parts from front to rear.

FIG. 2 is a fragmentary perspective view of mullion coupling elements shown in FIG. 1.

FIG. 3 is a fragmentary exploded vertical sectional view of a mullion joint shown in FIG. 1.

FIG. 4 is a transverse sectional view taken in the plane indicated by line IV—IV in FIG. 1.

FIG. 5 is a transverse sectional view taken in the plane indicated by line V—V of FIG. 1.

FIG. 6 is a transverse sectional view taken in the plane indicated by line VI—VI of FIG. 1.

FIG. 7 is an enlarged fragmentary perspective view of a mullion joint connection and a horizontal member connection embodying the invention.

FIG. 8 is a fragmentary exploded perspective view illustrating the connection of the horizontal member to the mullion.

FIG. 9 is a fragmentary vertical sectional view of a horizontal member embodying this invention, the section being taken in a vertical plane spaced from the vertical mullions.

FIG. 10 is a fragmentary transverse sectional view taken in the plane indicated by line X—X of FIG. 9.

FIG. 11 is a fragmentary perspective exploded view of a different embodiment of the releasable connection of the horizontal member to the vertical mullion.

FIG. 12 is a vertical sectional view taken through a horizontal member embodying the construction shown in FIG. 11.

It will be understood that in my Letters Patent No. 3,357,145, there is described an exemplary curtain wall construction which includes a solid curtain wall panel and a glass wall panel supported by curtain wall framing. Such framing includes laterally spaced vertical mullion means, each formed of adjoining mullion members arranged in a vertical column and extending between adjacent mullion columns are vertically spaced horizontal channel members 20 which define a curtain wall opening. The horizontal members are supported from the mullion columns so as to permit expansion and contraction of the horizontal members; likewise, the vertical mullions are provided with joints which also permit expansion and contraction between adjacent members. In addition, the curtain wall construction of said patent describes means for barring water from the interior side of the curtain wall construction.

The present application which is a divisional application of Ser. No. 676,240, embodies certain features of the modified curtain wall construction. Generally speaking, the present divisional application is directed to a mullion coupling means for a curtain wall construction. The coupling means includes vertically spaced aligned mullion members having mullion recesses which receive a sleeve member and a sleeve cap member permitting limited relative vertical movement between such members. The sleeve member and sleeve cap member are so arranged as to present a continuous face cooperable with an edge face of the mullion recess. Curtain wall panel gasket means cooperate therewith and extend across spaced mullion members to prevent passage of water to the inside of the curtain wall. The invention also includes the provision of a barrier plate arranged between the sleeve members and secured thereto.

In FIG. 1, a portion of a structural steel building frame work 100 may support an anchor means 101 provided with an anchored plate 102 connected by suitable means such as rivets or bolts 103 to a vertical mullion column 104. Each mullion column 104 may include a plurality of vertically aligned spaced mullion members 106, each comprising rolled steel mullion segments 107 of similar cross-sectional configuration and symmerically arranged about a vertical plane bisecting the mullion column 104. Each mullion segment 107 comprises a front mullion portion having a side wall 108, a front wall 109 disposed at an acute angle to its contigous side wall 108, a front return lip 110, and a recess wall 111, all of which form with the corresponding adjacent mullion segment 107 a front hollow mullion portion. Each mullion segment includes a back portion comprising a vertically extending web 114 rolled integral with recess wall 111 of the front portion, and a back recess wall 115 which forms with web 114 and recess wall 111 a vertically extending mullion recess. A mullion recess opening 116 may be defined by gasket retaining channels 117 formed by opposed rolled parallel channel portions 118 projecting inwardly from the spaced parallel planes of recess walls 111 and 115. Webs 114 are in back-to-back, face-to-face abutment and segments 107 may be secured together to form a mullion member 106 as by welding along webs 114.

Means for coupling or splicing together vertically spaced aligned mullion members 106 while permitting longitudinal expansion and contraction thereof may include a longitudinally split front sleeve member 120 having its bottom end portion sleeved within the hollow front portion of the lower mullion 106 and secured therein as by cementing at 121. The configuration of sleeve 120 corresponds with the internal surface configuration of the hollow mullion front portion as best seen in FIG. 5 and includes a channel 110a for slidably frictionally holding lips 110 together. The upper portion of sleeve 120 extends above the top of lower mullion 106 for sliding reception in the lower front hollow portion of the upper mullion 106 as best seen at 122, FIG. 1.

The mullion coupling means also includes in each mullion recess a generally channel section back sleeve 124 having a configuration similar to the internal surface configuration of the mullion recess as defined by web 114, recess walls 111 and 115, and channel projecting portions 118. Back sleeves 124 may be preassembled with a water-barrier plate 135 for handling as a unit by securing plate 135 in position between sleeves 124 by suitable rivets or spot welding at 137. This mullion coupling unit may be sleeved onto the top portion of a lower mullion with lower sleeve portions receiving therebetween the back-to-back webs 114 until the bottom edge of barrier plate 135 abuts the top edges of webs 114. A non-drying mastic is applied to the bottom edge of plate 135 and upon abutment with webs 114, a seal is afforded between these edges. Back sleeves 124 may be secured by suitable means such as rivets or bolts 125 to the upper portion of lower mullion 106 and may project above the top of lower mullion 106 at a distance greater than the distance that the front sleeve projects thereabove.

The bottom portion of upper mullion 106 may carry in its mullion recesses sleeve cap means 126 secured thereto as by a common rivet or bolt 127. The top portion of sleeve cap 126 may be of relatively thick section and engages internal surfaces of the mullion recess. Beneath the thick section, sleeve cap 126 is provided with a depending bottom sleeve portion 128 spaced from the internal surfaces of the mullion recess a sufficient distance to slidably receive the top portion of sleeve 124 in telescopic relation therewith as best seen at 129, FIG. 1. Sleeve cap 126 is of generally channel section and its flange 126a adjacent inner recess wall 111 extends to and contacts the gasket-holding channel portion 118. To facilitate the telescopic relation of the cap 126 and sleeve 124, a lip 124a formed on sleeve 124 adjacent wall 111 is relieved or cut out at 124b to receive the lower portion of flange 126a.

When the upper mullion member 106 is lowered into assembly with the lower mullion 106, upwardly extending open-ended rectangular notches or recesses 132 provided in webs 114 receive in spaced relation barrier plate 135. The top edge 134 of plate 135 may carry a sufficient amount of mastic sealant to close in sealed relation web space 133 (FIG. 5) above edge 134.

Each mullion coupling means as above described thus comprises a front sleeve 120 which reinforces, aligns and closes the expansion space between adjacent ends of mullion members 106 at the hollow front portions thereof and a pair of back sleeve means including sleeves 124 and caps 126 which engage internal surfaces of the oppositely facing mullion recesses.

Means for preventing water from traveling from the mullion column 104 along bottom edges of mullion members 106 inwardly of the curtain wall and for directing water and moisture downwardly past each mullion joint without leakage to the back face of the mullion column or the curtain wall includes the notches 132 in webs 114. In this example, it should be noted that notch 132 extends above the bottom edge of depending sleeve portion 128 of sleeve cap means 126 and that in assembly (FIG. 1), top edge 136 of the notch lies below the top edge of back sleeve 124. Barrier plate 135 has a width less than the width of notch 132 and a height such that the top edge of plate 135 will be spaced from the top edge of notch 132 at least equal to the expansion spacing between adjacent mullion ends at the mullion joint.

In the present embodiment, it will be apparent that any moisture or water which may collect or drain through the front hollow portion of mullion column 104 will be directed past each mullion joint by front sleeve 120.

Water, which may drain along the inner edges 140 (FIG. 5), of front sleeve 120, may reach, collect and move inwardly along bottom edge 141 of upper mullion member 106. When such water reaches right angle 142 formed by notch 132, the change in direction of the metal material will cause water to collect and drop downwardly to the top edge 143 of lower mullion 106 where it will drain outwardly into the front hollow portion of the mullion column because of barrier plate 135 which occupies space 133.

The back sleeve caps 126 and cooperable sleeves 124 are further constructed to provide a positive seal against water leakage at the mullion joint and particularly along mullion recesses. The top outer edge of sleeve cap 126 may be beveled to provide a peripheral recess 138 which may be filled with a suitable caulking or sealant compound or composition of well known sealant material. The interior flange of cap 126 positioned against recess wall 115 includes an inwardly directed return lip 126b which presents a vertical inner edge 126c substantially in the plane of the edges 118a and the co-planar edges 124c of the adjacent lip 124d of sleeve 124. A panel received in the mullion recesses spans a mullion joint, and a gasket strip 200 retained in channel portion 118 has continuous sealing engagement with edge faces 126c of the sleeve cap return lip 126b, edge 124c of lip 124d of sleeve 124, and edges 118a of channel portion 118. Thus, water drainage is diverted by sealant at 138 to the inner surface of cap 126 and passes downwardly to the inner surface of sleeve 124. At the expansion space between the top of sleeve 124 and the shoulder formed by the thick section of sleeve cap 126, water cannot pass along edges of lips 126b, channel portion 118, and edge 124c to drain between the depending sleeve portion and the upper sleeve portion to the mullion joint. Water draining downwardly along internal surfaces of the lower portion of sleeve 124 will continue downwardly along internal surfaces of the walls 114, 115 and the mullion recess until the water encounters sleeve cap 126 of the mullion joint therebelow where it is again diverted in similar manner. Thus, the cooperable engagement of the gasket strip 200 with the sleeve cap, mullion channel portions, and sleeve member prevents water from traveling inwardly of the mullion column at the vicinity of a mullion joint. Weep holes (not shown) are provided at the bottom of each mullion column to drain water outwardly away from the curtain wall.

At spaced vertical intervals along mullion column 104, horizontal members generally indicated at 150 may extend between said columns and be releasably connected therewith for relative movement between the mullion column and horizontal members to allow exapnsion and contraction of the horizontal member. Each horizontal member 150 may be made of a rolled steel section and may comprise a horizontal web 151 (FIG. 7), a back upstanding flange 152 and a front depending flange 153 provided with an inwardly directed channel-like edge portion 154. The front face of the channel portion 154 may lie in a plane forwardly of the front face of the depending flange 153 to provide a seat at 155 for a longitudinally extending member 156 secured as by rivets 157 to flange 153 at locations spaced below horizontal web 151. The top longitudinally extending portion 158 of member 156 may be of channel section facing inwardly and above web 151.

Horizontal member 150 includes opposite end portions of similar construction for connection to mullion columns 104, only one end portion being described and being best shown in FIGS. 7, 8 and 9. Each end portion of member 150 has its horizontal web 151 and flanges 152, 153 including channel portion 154 received within the opening 116 of the mullion recess. As best seen in FIG. 9, the inner face of flange 152 slidably engages as at 160, edges of projecting channel portions 118. Channel portion 154 has an outer face which slidably engages as at 161, the opposite face of projecting portion 118 of the mullion recess. Such abutting sliding engagement limits front and back movement of horizontal member 150 with respect to mullion columns 104.

Adjacent each end of horizontal member 150 web 151 may be provided with a pair of laterally spaced longitudinally elongated rectangular openings 162 which receive therethrough, in assembly, upstanding portions 163 of sidewardly extending arms 164 integrally formed on a support bracket 165 secured as by rivets 166 to vertical web 114 of mullion segment 107. Bracket 165 includes a resilient tab 167 struck out of the body portion of bracket 165 and extending toward the upstanding portions 163. In assembly of horizontal member 150 with mullion column 104, end portions of each horizontal member are inserted by vertical tilting of the horizontal member in the plane of the mullion columns so that the end portions may be received within the mullion recesses. The horizontal member is then moved to a horizontal position and lowered so that upstanding projections 163 are received within openings 162 and the adjacent bottom surface of the web 151 rests upon top edges 168 of arms 164. In this position of horizontal member 150, resilient tab 167 may be urged outwardly over the top adjacent surface of web 151 to restrain the horizontal member from upward movement. The elongated rectangular openings 162 permit relative movement between the mullions and horizontal member caused by expansion and contraction and bottom edge 169 of the resilient tab as well as top edges 168 of arms 164 respectively slidably engage the top and bottom surfaces of web 151.

A caulking or sealant compound 169a may be used to fill and seal space between the ends of flanges 152, 153 and web 151 of the horizontal member 150 and the adjacent mullion surfaces defining the mullion recess. Water passing onto the horizontal member may be dispersed and drained therefrom through openings 162 and through suitably located weep holes (not shown).

A modification of a releasable connection of horizontal member 150 to mullion column 104 is shown in FIGS. 11 and 12. In this instance, like reference numerals with a prime sign will be used to facilitate description of the modification.

In FIG. 11, horizontal member 150' includes a horizontal web 151' of slightly greater width than web 151 so that vertical upstanding flange 152' and the depending front flange 153' may slidably engage surfaces of vertical mullion channel portions 118 which define opening 116 of the mullion recess. Bottom channel portion 154' extends forwardly of flange 153' and into the mullion recess opening and is provided with a notch-like opening 162' having a width sufficient to loosely embrace a channel portion 118 and to permit relative movement of horizontal member 150' with respect to the mullion 104 for expansion and contraction thereof.

In this example, the bracket 165' secured to the web of the mullion within the mullion recess includes spaced parallel outwardly extending arms 164' having top edges 168' for slidably supporting web 151'. Arms 164' are not provided with projections 163. Similarly to bracket 165, bracket 165' includes an outwardly extending resilient tab 167' adapted to slidably engage the top surface of web 151'.

Horizontal member 151' may be provided with a horizontal forwardly extending top portion 170 which overlies the top surface of web 151'.

In assembly of modified horizontal member 150' with a mullion column 104, horizontal member 150' is first tilted forwardly about its horizontal axis, is then inclined in the palne of the columns so as to permit ends of the horizontal member to be received within opposed mullion recesses and is then moved to a horizontal position and rotated about its horizontal axis so that the notch-like openings 162' receive therewithin a portion of channel 118 on the mullion. The horizontal member may then be lowered until web 151' rests upon arms 164' and resilient tab 167' is urged outwardly to restrain the horizontal web from upward movement. It will be apparent that in such position the horizontal member is limited in front and rear movement by the flanges 152', 153' engaged with mullion channel portions 118, vertical movement is prevented or limited by arms 164' and resilient tab 167' and relative horizontal movement of the member 150' with respect to the mullion is permitted by the notch-like opening 162'.

In both modifications of the releasable connection of horizontal member 150, 150' to the mullion column, it should be noted that the horizontal member is provided with means providing an opening for engagement with a projecting portion carried by the mullion, that is either upstanding portions 163 or the projecting portion formed by channel 118.

Each of the horizontal members 150, 150' include a similar cross-sectional shaped front curtain wall panel retainer member 172 having a front wall 173 extending horizontally between side faces 108 of adjacent mullion columns 104 and forwardly of the mullion recess opening. A bottom horizontal inwardly extending hook-like flange 174 is adapted to engage as at 175 the edge portion of channel 154 or 154'. A top flange 176 extends inwardly and is provided with a depending longitudinally extending portion 177 provided with a gasket mounting channel-like configuration 178 and a depending inwardly bent lip 179 to facilitate snapping or clipping retaining member 172 to top portion 158 of the horizontal member 156. As best seen in FIG. 9, retainer member 172 is readily assembled by forwardly inclining the member about a horizontal axis so as to first engage hook portion 175 with channel 154 or 154' and then to pivot the retainer member about such engagement to snap the depending portion 177 over the top flange of wall 156.

Means for retaining member 172 in snug engagement with horizontal member 150 includes spring means 180 carried by wall 156 and having a hook portion 181 engaged with the top flange of wall 156 and a depending front leg 182 in pressure engagement with the inner surface of member 172.

In the embodiment shown in FIG. 12, spring means 180' may be secured by a stud rivet 183 to depending front flange 153', said spring means 180' having a forwardly extending pressure leg 182' in engagement with the front wall 173 of retainer member 172 to hold the member in snug assembled engagement with the horizontal member.

In the present modification of the invention, a back retainer member 190 of generally U-section may be employed for pressure mounting a panel along the bottom of a horizontal member 150. Retainer member 190 includes a back wall 191 having a forwardly and upwardly turned longitudinally extending C-section edge portion 192 for cooperable engagement with a depending and slightly forwardly extending rolled bead 193 formed on horizontal member 150 at the juncture of horizontal web 151 and upstanding rear flange 152. A bottom wall 194 may be joined with a front wall 195 by a channel section configuration 196 to provide suitable mounting means for a panel gasket. Front wall 195 includes a forwardly extending longitudinal portion 197 adapted to be positioned between the top of stud rivet 183 and the bottom surface of web 151 to provide a positioning means for back retainer member 190.

In assembly, retainer member 190 is positioned with respect to horizontal member 150 by stud 183 and flange 197 and is then pressed upwardly to engage the C-section longitudinal section 192 with the depending bead 193. It will thus be apparent that the resiliency of metal retainer member 190 provides a forwardly directed pressure against a curtain wall panel.

Curtain wall panels are retained in the framing provided by the mullion columns and horizontal members along vertical edges by suitable gaskets 200 and 201 mounted in the channel portions 118 of the mullion recesses. The bottom edge of a panel 202 of relatively thick section may be retained by the horizontal member by a back gasket 203 carried by upstanding flange 160 and a front gasket 204 held in place by the front retainer member 172. In the present example in FIG. 9, a glass panel 206 has its top edge retained by a front gasket 207 carried by the channel portion of the depending front flange 153 and a back gasket 208 carried by the back retainer member 190 as described above.

In the embodiments of the invention shown in FIGS. 1 to 12 inclusive, it will be readily apparent to those skilled in the art that an advantageous way of assembling aligned mullion members with an effective water barrier has been shown and described, alignment of such assembly being facilitated by the fixed front sleeve 122 of relatively short height and the back channel sleeves of relatively great height as compared to the front sleeve. The preassembled back sleeve unit with water-barrier plate 135 is readily assembled and secured to the upper portion of lower mullion member 106 and sleeve cap means 126 in each mullion recess further aligns and reinforces the mullion coupling. It is particularly important to note that the sleeves 124 and sleeve cap means 126 cooperate with channel portions 118 and the gasket strip held thereby to provide a sealed coupling joint at expansion spaces between mullion ends and sleeves 124 and sleeve cap means 126 and which prevents water from reaching the back surfaces of the mullion members 106 and inside the curtain wall.

It should also be noted that in the present invention the releasable connection between the horizontal member and the mullion column does not require field placement of a pin to restrain vertical movement of the horizontal member. Instead, the mounting brackets 165, 165' provide a support and a vertical restraining means which may be mounted on the mullion column at the fractory. Thus, an advantageous method of assembling horizontal members with mullion columns is provided whereby the horizontal members are limited in movement in any direction and are connected to the mullion columns without use of auxiliary tools.

Various modifications and changes may be made in the curtain wall construction described above and also changes and modifications coming within the scope of the appending claims are embraced thereby.

I claim:
1. In a curtain wall construction, the combination of:
 a pair of vertically spaced mullions in longitudinal alignment;
 each mullion including a hollow front portion and a sidewardly facing recess portion adjacent said front portion and defined by vertical webs interconnecting a mullion recess wall forming part of the front portion and a spaced recess wall and defining oppositely facing mullion recesses;
 a sleeve fitted within the front portion of one mullion and extending beyond the end of said one mullion and slidably received in the front portion of an adjacent end of a second mullion adjacent thereto;
 a U-section sleeve fitted within the adjacent mullion recess of said one mullion and extending upwardly beyond the end of the sleeve of the front portion of said mullion;
 an upstanding plate secured to the web of said U-section sleeve;
 a U-section sleeve cap member carried in said mullion recess of said second mullion and having a depending U-portion spaced from the mullion recess walls and received within the U-section sleeve of said one mullion; and
 means on said U-section sleeve, U-section sleeve cap member, and mullion recess walls adapted for co- operation with a curtain wall panel gasket means for preventing passage of water to the inside of the curtain wall.

2. Mullion coupling means for a curtain wall, including vertically spaced aligned mullion members having mullion recesses adapted to hold panel recess means; the provision of:
- a sleeve member positioned in the upper portion of a mullion recess in a lower mullion member;
- a sleeve cap member positioned in the lower portion of a mullion recess in an upper mullion member;
- the sleeve cap member having a depending portion received in said sleeve member and providing limited relative vertical movement therebetween;
- each mullion member having a vertically extending channel portion having edge faces;
- gasket means on said mullion members; and
- means on said sleeve member and on said sleeve cap member presenting a continuous face cooperable with said channel portion edge faces and said gasket means for providing a seal across spaced mullion members.

3. A mullion coupling means, as stated in claim 2, including a coupling unit comprising a pair of said sleeve members in back-to-back, spaced relation; and
- a barrier plate between said sleeve members and secured thereto.

4. A mullion coupling means, as stated in claim 2, wherein said means on said sleeve cap member which presents a continuous face includes a return lip on a flange of said sleeve cap member,
- said face lying in about the same plane as said channel portion edge face.

5. A water barrier coupling means for mullion means for a curtain wall construction including an arrangement of mullion members having aligned mullion recesses, the combination:
- sleeve means in said mullion recesses and extending between said mullion members and movable therewith during expansion and contraction;
- means on said mullion members having an edge face at the opening of said mullion recesses;
- said sleeve means presenting a virtually continuous face adjacent to and parallel to said edge face;
- and gasket means on said mullion members extending along and cooperable with said faces providing with said sleeve means a continuous seal between adjacent mullion members.

6. A coupling means as stated in claim 5 wherein said sleeve means includes flange portions extending along said means having an edge face on the mullion members.

7. A water barrier coupling means for mullion means for a curtain wall construction including an arrangement of mullion members having aligned mullion recesses, the combination of:
- sleeve means in said mullion recesses and extending between said mullion members and movable therewith upon expansion and contraction of said mullion members;
- said sleeve means including a sleeve member carried by one of said mullion members;
- and a water barrier means secured to said sleeve member and sealingly engaging the upper end of the lower mullion member to cooperate with said mullion members for preventing movement of water towards the inside of said curtain wall construction.

8. A coupling means as stated in claim 7 wherein an upper mullion member incudes a downwardly directed opening in one of the walls defining said mullion recess;
- said water barrier means on said sleeve member extending into said opening on said mullion wall and in spaced relation to edges of said opening.

9. Mullion coupling means for use with a curtain wall having vertically aligned mullion members, comprising:
- a sleeve member for attachment to one of the mullion members;
- a sleeve cap member for attachment to another of the mullion members, said sleeve cap member having a portion received within said sleeve member for a sliding connection therebetween; and
- water barrier means secured to said sleeve member for cooperation with said mullion members to prevent the movement of water towards the inside of the curtain wall.

10. A water barrier coupling means as recited in claim 5 wherein the cross-sectional configuration of the sleeve means corresponds to the configuration of the internal surfaces of the mullion members defining the mullion recesses.

References Cited

UNITED STATES PATENTS

| 2,390,000 | 11/1945 | Sampson | 182—178 |
| 2,916,108 | 12/1959 | Gartner | 52—235 |
| 3,119,635 | 1/1964 | Dealy | 287—2 |
| 3,206,901 | 9/1965 | Bakke | 52—235 |
| 3,223,209 | 12/1965 | Skromeda | 52—235 |

FOREIGN PATENTS

| 216,977 | 1958 | Australia. |
| 665,909 | 1963 | Canada. |
| 1,271,188 | 1961 | France. |
| 379,843 | 1964 | Switzerland. |

HENRY C. SUTHERLAND, Primary Examiner

U.S. Cl. X.R.

52—235, 726; 287—189.36